United States Patent [19]
Zelinski

[11] 4,321,358
[45] Mar. 23, 1982

[54] WATER TERMINATION OF POLY(ARYLENE SULFIDE) CURING

[75] Inventor: Robert P. Zelinski, Bartlesville, Okla.

[73] Assignee: Phillips Petroleum Company, Bartlesville, Okla.

[21] Appl. No.: 212,186

[22] Filed: Dec. 2, 1980

[51] Int. Cl.³ ............................................. C08G 75/14
[52] U.S. Cl. .................................... 528/388; 528/373; 528/389
[58] Field of Search ...................... 528/373, 388, 389

[56] References Cited
U.S. PATENT DOCUMENTS

| | | | |
|---|---|---|---|
| 3,717,620 | 2/1973 | Rohlfing | 528/388 |
| 3,793,256 | 2/1974 | Scoggin | 528/388 |

*Primary Examiner*—Melvyn I. Marquis

[57] ABSTRACT

In the pre-curing of particulate poly(arylene sulfide) by contact with an oxygen-containing gas in a vessel at a temperature elevated to a range of about 10° to about 70° C. below the melt point of the resin, upon reaching the desired level of pre-cure, the particulate resin is contacted with water thereby rapidly to reduce the temperature level below the temperature at which curing occurs.

7 Claims, No Drawings

WATER TERMINATION OF POLY(ARYLENE SULFIDE) CURING

BACKGROUND OF THE INVENTION

This invention relates to the controlled curing of poly(arylene sulfide) resins. In one of its aspects it relates to the termination of the curing process for poly(arylene sulfide) resin.

It is well known that aromatic sulfide polymers having a relatively high melt flow, e.g., above about 4000, are of limited use unless they are treated by contacting the resin, preferably in particulate form, with an oxidizing atmosphere at a temperature below the melting point of the resin. This treatment, usually called "precuring," is carried out by balancing the time and temperature conditions to produce the desired melt flow characteristics for the particulate resin.

There is a difficulty, however, both in terminating the pre-curing at a particular level and in obtaining a uniformity of treatment for all the resin in a treatment vessel. The uniformity of treatment is complicated by a variation in the rate at which particles are cooled to a temperature below the curing temperature at the conclusion of the precuring operation.

An answer to these problems has been proposed by U.S. Pat. No. 3,793,256 in which a process is set out for terminating the precuring reaction by flushing out the oxidizing atmosphere from the curing vessel with an inert gas, such as steam, and then cooling the resin in the presence of this inert gas to a temperature below the curing temperature of the resin. Below that temperature, air can again be used for further cooling.

It has now been discovered that liquid water can be used as a quenching agent to reduce the temperature of the curing resin below the curing temperature. Using water the temperature is decreased rapidly and with an increased degree of control since the amount of water needed for the termination of curing can be easily calculated and readily added with accuracy. The use of liquid water is cheaper than steam because no outside energy source is necessary to convert water to steam before addition to the treating vessel. Actually, the addition of water into the vessel usually has the effect of generating a blanket of steam that helps to flush out the oxidizing atmosphere from the treatment vessel.

It is therefore an object of this invention to provide an economical, accurate, and easily accomplished method for terminating the precuring treatment of poly(arylene sulfide) resin. It is another object of the present invention to provide a process for improving the processing characteristics of poly(arylene sulfide)resins. Another object of the invention is to provide an improved process for increasing the molecular weight of poly(arylene sulfide) resins. It is an object of this invention to provide an improved process for controlling the curing level of poly(arylene sulfide) resins. Another object of the invention is to improve the uniformity of curing of poly(arylene sulfide) resins. A further object of the invention is to provide an improved process for producing arylene sulfide polymers having desired melt flow properties.

Other objects, aspects and advantages of the invention will be apparent to those skilled in the art upon reading the specification and the appended claims.

According to this invention, a method for pre-curing particulate poly(arylene sulfide) resin is provided in which the resin particles are first contacted in a vessel with an oxygen-containing atmosphere and heated to a temperature in a range of about 10° to about 70° C. below the melt point of the resin for a time sufficient to effect pre-cure of the resin, the heating is terminated, and the pre-cured particles are contacted with water in an amount sufficient and for a time sufficient to reduce the temperature of the resin below the temperature level at which curing occurs.

The process set out in U.S. Pat. No. 3,793,256 is exactly equivalent to the present process up to the point of cooling the treated resin. The present invention, however, provides economies and ease of operation which offer an attractive alternative to the prior art process. For convenience, the disclosure of the pre-curing process from U.S. Pat. No. 3,793,256 is included below.

The invention is broadly applicable to poly(arylene sulfides) formed by any known technique. It can be used, for example, with the resins manufactured as described in U.S. Pat. No. 2,513,188, prepared by reacting mixtures of p-dichlorobenzene and 1,2,4-trichlorobenzene with sulfur and metal halide at fusion temperatures. It can also be used with the resins manufactured by the method described in British Pat. No. 962,941, wherein metal salts of halothiophenols are heated at a polymerizing temperature. The invention is especially useful with polymers prepared as described by James T. Edmonds, Jr. and Harold Wayne Hill, Jr. in U.S. Pat. No. 3,354,129, issued Nov. 21, 1967. As disclosed in the Edmonds et al patent, these polymers can be prepared by reacting a poly-halo-substituted cyclic compound containing unsaturation between adjacent ring atoms and an alkali metal sulfide in a polar organic compound. The resulting polymer contains a cyclic structure of the polyhalo-substituted compound coupled in repeating units through a sulfur atom. The polymers which are preferred for use in this invention, because of their high thermal stability and availability of the materials from which they are prepared, are those polymers having the repeating units —R—S— wherein R is phenylene, biphenylene, naphthalene, biphenylene ether, or a lower alkyl-substituted derivative thereof. The term "lower alkyl" is used herein to mean alkyl groups having 1 to 6 carbon atoms, such as methyl, propyl, isobutyl, n-hexyl, and the like.

Polymers which are generally preferred are those which have melting temperatures above about 200° C. These arylene sulfide polymers can have a melting temperature anywhere in the range of about 200° C. to about 500° C. Polymers of phenylene sulfide normally have melting temperatures in the range from about 290° C. to about 480° C. The preferred polymers have an inherent viscosity in 1-chloronaphthalene at 206° C. (modified ASTM Method D-1243-60) of at least 0.1, more preferably between 0.1 and 0.3, and ideally between 0.13 and 0.23.

It has been found that an improved poly(arylene sulfide) resin can be obtained by heating the virgin poly(arylene sulfide) resin in particulate form in the presence of an oxygen-containing gaseous oxidizing atmosphere at a temperature below the melting point of the resin for a time sufficient to effect a desired reduction in the melt flow of the resin. The thus modified polymer is is a stable resinous material which retains its original physical appearance, e.g., particulate shape, and also remains sufficiently thermoplastic to be formed into shaped articles as by injection or compression molding with substantially reduced processing times. It is understood that the properties of the modified polymeric material will vary depending upon the nature of the virgin polymer and the length of time and the temperature of the heat treatment and the level of contact with the oxidizing agent.

In accordance with the invention, the polymer is heated in the presence of an oxygen-containing gaseous oxidizing medium to a temperature which is below the melting point of the chosen polymeric product for a period of time sufficient to effect cure and reduce the melt flow. The melting point of arylene sulfide polymers can be readily determined by differential thermal analysis (DTA) by heating a 10 mg sample of the polymer at a rate of 10° C. per minute. The melting point is taken from the DTA thermogram in a conventional manner. The temperature will vary within the range of about 200° F. to about 1000° F. depending upon the molecular weight and nature of the polymeric product being treated. Generally, the treatment temperature will be in the range of from about 10 to about 70° C., preferably from about 25° to about 55° C., below the melting point of the polymer being treated. The time during which the mixture is held at such a temperature will be sufficient to effect pre-cure and reduce the melt flow, and ordinarily will range from about 10 minutes to about three days, usually from about 2 to 12 hours, with the longer times being used at lower temperatures and vice versa, depending specifically on the type of polymer being processed. The preferred time for a polyphenylene sulfide resin, for example, is 2 to 8 hours at a temperature ranging from about 25° to about 55° C. below the melting point of the polymer.

As indicated above, the heating is carried out in the presence of an oxygen-containing gaseous oxidizing atmosphere such as oxygen, a mixture of nitrogen and oxygen, or preferably, air. The oxidizing gas rate with respect to contacting of the particulate resin will vary appreciably, depending upon the type of apparatus employed for carrying out the oxidative curing. The heating according to the invention can be carried out in conventional equipment. In a presently preferred embodiment the virgin poly(arylene sulfide) resin in the form of a body of heated solid particulate particles is pre-cured by passing preheated air through the interstices.

It is within the ambit of the present invention to operate the treatment vessel with mechanical agitation to provide better contact of particles with the treating agents and with each other for heat exchange.

By the process of the present invention, when the desired level of pre-cure is achieved the passage of oxidizing gas through the body of solid particle of poly(arylene sulfide) resin is terminated and a flow of water, preferably, a water spray, is directed into the body of solid particle. The volume of the flow of water and its duration will be dependent upon the amount of poly(arylene sulfide) resin particles, treating temperature, and the configuration of the vessel in which the particles are contained. In general, the spraying with water will be completed in from 1 minute to 30 minutes, preferably in from 1 to 10 minutes, and more preferably in less than 5 minutes. As example of the volume of water spray, the treatment of about 2000 lbs of resin particles can be accomplished with a water spray flow of about 2 to about 5 gallons per minute. The addition of the water to the body of particles generates steam which acts in itself as a flux for removing the oxidizing gas remaining in the body of particles. The water with its high capacity for cooling rapidly decreases the temperature of the body of particles below that at which further curing in the presence of oxidizing gas would occur. After cooling to this point has been achieved the flow of water can be stopped and a stream of air or other gas that is cooler than the body of resin particles can be introduced to complete the cooling.

The following example is presented to further illustrate the invention, but should not be construed as an undue limitation.

EXAMPLE

A jacketed, steel curing vessel equipped with a double spiral agitator rotating at 58 RPM and a sparging means to introduce air was charged with about 13,500 lbs. (6125 kg) of particulate, virgin polyphenylene sulfide having a melt flow of about 6500 g/10 minutes (ASTM D1238-70, 316° C., 5 kg weight). Heated oil (260° C.) circulating through the jacket provided the source of heat needed for the curing vessel. During the heating period and the cooling period, except during the water spraying interval, the agitated resin was contacted with 0.5 standard cubic feet per minute of air at ambient temperature. During water cooling the air rate was decreased to about 0.2–0.25 std ft$^3$/minute to reduce water loss. Thus the total amount of air contacting the resin bed during the curing operation was calculated to be about 9450 cubic ft. The temperature of the resin bed, initially at about 25° C., was about 182° C. 32 hours later. At that time the melt flow of a test sample was 131 which was in the desired range. Cooling of the circulating hot oil was initiated and the resin bed was sprayed with water at ambient temperature at the rate of 2 gallons/minute (7.5 liters/minute) for 30 minutes to further expedite the cooling process and to limit the amount of further curing. Following the water quenching treatment the resin bed temperature with resumed introduction of air had decreased to about 165° C. and 90 minutes later it was about 150° C. A melt flow test at that time gave a value of 129, very close to the 131 value determined just prior to the water quenching operation. The cured resin after cooling another hour was blended with several lots of previously cured resin of a lower melt flow. The melt flow of the final blend was 112.

I claim:

1. A process for pre-curing particulate poly(arylene sulfide) resin comprising:
   (a) heating the resin particles in a vessel in contact with an oxygen-containing atmosphere to a temperature in the range of about 10° to about 70° C. below the melt point of the resin for a time sufficient to effect the pre-cure,
   (b) terminating the heating, and
   (c) contacting the pre-cured particles with water of sufficient volume and for a sufficient time to reduce the temperature level below the level at which curing occurs.

2. A process of claim 1 wherein the oxygen-containing atmosphere is air.

3. A process of claim 1 wherein said vessel is mechanically agitated.

4. A process of claim 1 wherein the particles are heated to a temperature within a range of about 25° to about 55° C. below the melt point of the resin.

5. A process of claim 1 or 4 wherein upon reaching a temperature below that at which curing occurs, further cooling is accomplished by cool air flow.

6. A process of claim 1 or 4 wherein said resin comprises poly(phenylene sulfide).

7. A process of claim 5 wherein said resin comprises poly(phenylene sulfide).

* * * * *